United States Patent [19]

Frawley et al.

[11] 4,320,469
[45] Mar. 16, 1982

[54] WELL LOGGING: DEPTH CORRELATION OF LOGS

[75] Inventors: William J. Frawley, Newtown; Philip A. Mongelluzzo, Waterbury, both of Conn.

[73] Assignee: Schlumberger Technology Corporation, New York, N.Y.

[21] Appl. No.: 80,790

[22] Filed: Sep. 28, 1979

Related U.S. Application Data

[63] Continuation of Ser. No. 358,685, May 9, 1973, abandoned.

[51] Int. Cl.³ .......................... G01V 1/40; G01V 1/36
[52] U.S. Cl. .................................... 367/33; 367/40; 364/422
[58] Field of Search .......................... 367/25, 33, 40; 364/422

[56] References Cited

U.S. PATENT DOCUMENTS 3,497,958  3/1970  Gollwitzer .................... 367/33

*Primary Examiner*—Nelson Moskowitz
*Attorney, Agent, or Firm*—Cooper, Dunham, Clark, Griffin & Moran

[57] ABSTRACT

In depth correlation of logs according to the subject invention, the starting data is an array of correlograms on a depth v. shift coordinate system. Unreliable correlation coefficients are eliminated to leave only valid ones, then valid clusters of correlation coefficients are examined to find reliable indications of trends in shift and in changes in shift. These indications are used to compute the shift and the corresponding depth which would result in a corrected correlation between the two logs from which the correlograms are derived.

15 Claims, 12 Drawing Figures

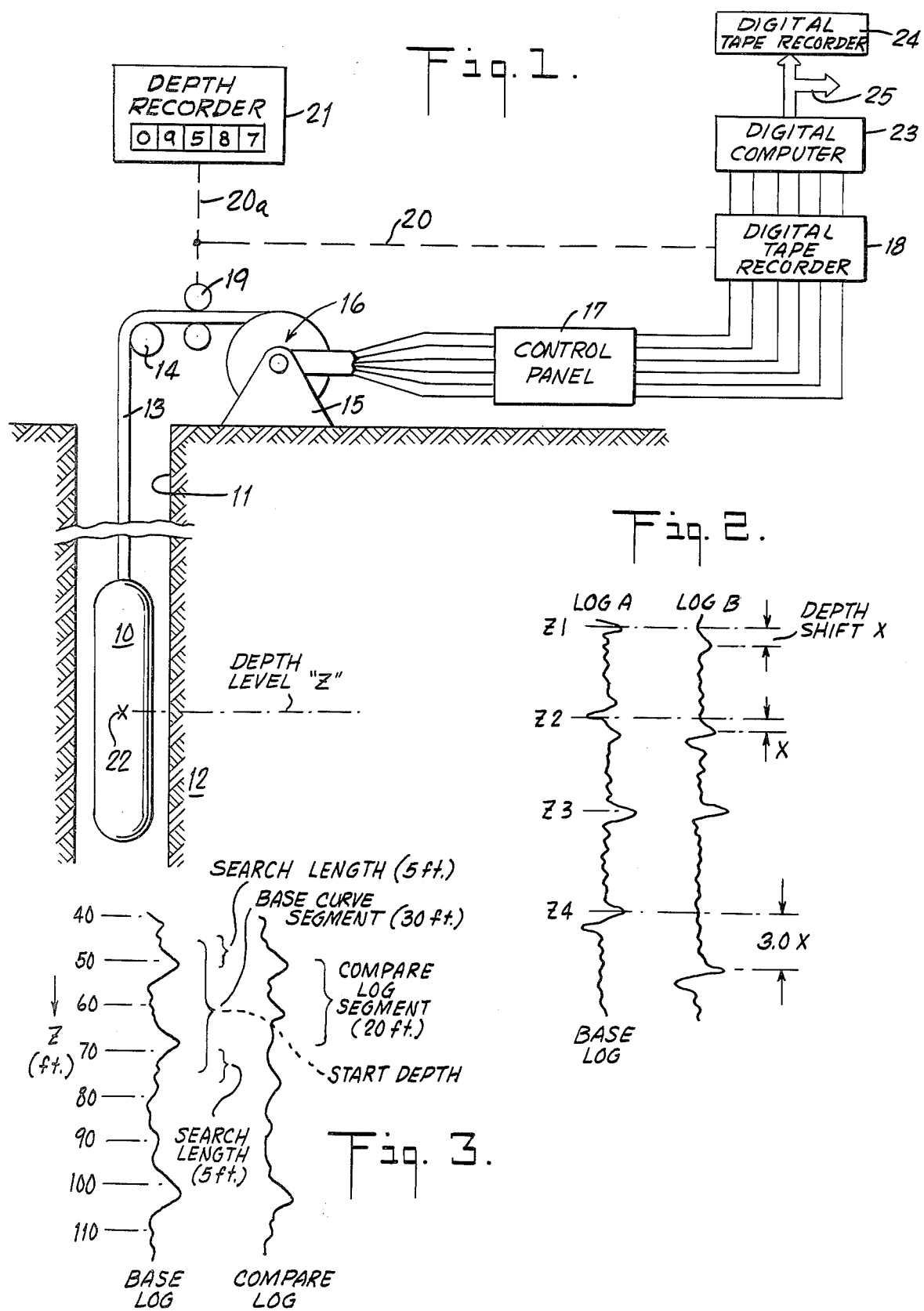

WELL LOGGING: DEPTH CORRELATION OF LOGS

This is a continuation, of application Ser. No. 358,685 filed May 9, 1973, now abandoned.

BACKGROUND OF THE INVENTION

The invention is in the field of well logging and relates specifically to correlating the relative depth levels of different sets of well logging data derived from separate passes of investigating devices through boreholes or from the same pass of a device.

In well logging, measurements of various formation characteristics are taken by an investigating device which is lowered into a borehole at the end of a supporting cable extending from the surface of the Earth. Measurements are taken at specified intervals as the device is drawn up. Typically, the measurements are intended to provide indications of oil or gas bearing strata, and may be measurements such as resistivity, inductance, and the like.

It has recently become common to combine, through sophisticated data processing techniques, different sets of measurements taken during passes of investigating devices through the same borehole or through different boreholes in order to produce computed measurements of various characteristics of the investigated Earth formations. When combining sets of measurements in this manner, it is important that they be accurately correlated in depth, e.g., when combining two different measurements each indicated as taken at depth of 2000 feet, it is important to be certain that each of these measurements has been in fact taken at depth of 2000 feet.

The depth at which a measurement is taken is commonly indicated by a sheave-wheel device which is located at the surface of the Earth and provides a measurement of the length of cable that passes over the sheave-wheel and suspends the investigating device in the borehole. However, this device does not generally take into account cable stretch, although the cable may stretch differently for different passes of the investigating device and even for different portions of the same borehole, because of factors such as changes in the borehole size, possible size and shape differences between different measuring devices, and the like.

Because of the desirability of accurate depth correlation of different logs, efforts have been made in the past to accurately measure the actual depth of the investigating device. One prior art technique involves accurate instantaneous cable length measurements, and is disclosed in U.S. Pat. No. 3,497,958 granted to L. H. Gollwitzer on Mar. 3, 1970. The Gollwitzer system measures the tension of the cable at the surface of the Earth and at the investigating device and corrects the cable length measurements indicated by the sheave-wheel device for changes in stretch as reflected by the tension measurements. The Gollwitzer system also corrects for sheave-wheel calibration errors and for temperature effects on cable stretch. While the Gollwitzer system has been found to provide extremely accurate depth measurements in most cases, there are factors which can cause slight errors. For the usual situation, these errors are insignificant and can be ignored. However, in certain of the recently utilized highly sophisticated data processing techniques applied to combining logs, even certain slight errors can become significant.

Another prior art approach to taking cable stretch into account involves the use of data processing techniques to determine the depth match between two or more logs derived from separate passes of investigating devices through a borehole or even from the same pass of the device. This approach is disclosed in U.S. patent application of David H. Tinch, Bruce N. Carpenter and Elie S. Eliahou filed on Sept. 9, 1970 and assigned Ser. No. 70,709. It involves determining first assumption depth displacement values for a number of log depth levels through use of a suitable correlation function. The first assumption depth displacement values for a selected number of depth levels are then analyzed to determine more accurate depth displacement values. This approach works well, but the need still remains for techniques and means for carrying out depth correlation that start with conventional data, such as correlograms obtained from applying a correlation algorithm to a pair of logs, reduce the amount of data that must be processed, and reduce processing time and processing complexity.

SUMMARY OF THE INVENTION

This invention is in the field of well logging and relates specifically to correlating the relative depth levels of logs. The logs may be obtained from different passes of investigating devices through the same or through different boreholes, or may be obtained from the same pass of single investigating device.

An object of the invention is to utilize conventional data, such as correlograms obtained from applying a correlation function to a pair of logs, to reduce the amount of data that must be processed, and to process the remaining data in an efficient and accurate manner in order to arrive at results indicating exactly how the two logs of interest must be shifted with respect to each other for an optimized depth correlation between them.

In a specific embodiment of the invention, a plurality of normalized and digitized correlograms are examined, and selected elimination parameters are applied to them in order to reduce the amount of data which must be processed further. For example, correlation coefficients which are below a certain cutoff value, and hence less reliable, may be marked for elimination, correlation coefficients which do not have a sufficient number of defined neighbors may also be marked for elimination, and other selected elimination parameters may be applied. A group of correlograms which satisfy the elimination parameters are stored in a cluster array, and additional elimination parameters are applied to the data stored in the cluster array to dispose of the less reliable portion of it. If the remaining data in the cluster array satisfies certain other parameters, it is examined to detect changes in shift between successive groups of correlograms where the correlograms of each group have the same shift value and each group consists of a sufficient number of correlograms. Such changes in shift are used to determine exactly how the logs that are under consideration should be shifted with respect to each other to optimize the correlation between them.

BRIEF DESCRIPTION OF THE DRAWINGS

FIG. 1 shows an investigating device in a borehole along with apparatus at the surface of the Earth for controlling the investigating device, for recording the measurements by it and for processing these measurements.

FIG. 2 shows an example of logs derived from a pass (or passes) of an investigating device of the type shown in FIG. 1 through a borehole (or boreholes).

FIG. 3 shows segments of two logs and illustrates the application of a correlation function thereto.

FIG. 7 shows a plurality of exemplary digitized correlograms.

FIG. 8 shows a portion of FIG. 7.

DETAILED DESCRIPTION

Figure 4:
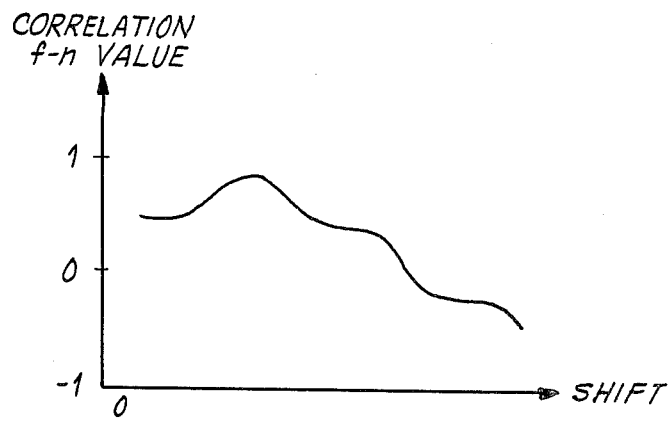
FIGS. 4, 5 and 6 show exemplary normalized correlograms in analog form.

Referring to FIG. 1, an investigation device 10 is suspended within a borehole 11 on a cable 13 to investigate subsurface Earth formations 12. The cable 13 passes over a sheave-wheel 14 and is secured to a drum and winch mechanism 15 which includes a suitable brush and slip-ring arrangement 16 for providing electrical connection between the conductors forming the cable 13 and a control panel 17. The control panel 17 operates to supply power and control signals to the investigating device 10 and includes suitable electronic circuitry for receiving well logging measurements from the investigating device 10 and for preparing them for recording by a digital tape recorder 18. The tape recorder 18 converts analog signals from the investigating device 10 into digital signals and records the digital signals. It is stepped as a function of depth by a driving wheel 19 which engages the cable 13 and a mechanical linkage 20. A detailed description of a recording system suitable for recording measurements from the investigating device 10 in the embodiment shown in FIG. 1 is disclosed in detail in U.S. Pat. No. 3,457,544 issued to G. K. Miller et al. on July 22, 1969, and entitled "Method and Apparatus for Recording Well Logging Data".

The digital tape recorder may record the data from a single pass of the investigating device 10 through the borehole 11 or the data from two or more passes of the investigating device 10 through the borehole 11. Two or more logs may be obtained from a single pass of the investigating device 10 in certain cases. The digital signals recorded by the tape recorder 18 are then either transmitted or carried to a digital computer 23 for processing in accordance with the subject invention, or to a suitable special purpose device (not shown) embodying the subject invention. The output of the digital computer 23, or the output of the special purpose device is recorded on a tape recorder 24 for later use, or is applied to a transmission channel 25 for transmission to another utilization device such as a digital computer or a special purpose device. The tape recorder 24 may be of the same type as the tape recorder 18.

The investigating device 10 has a reference point 22 which forms the center or recording point of the device 10. The depth of the investigating device 10 is registered by a depth recorder 21 which is driven via a mechanical linkage 20a by the driving wheel 19 engaging the cable 13. The depth level registered by the depth recorder 21 at each measurement by the investigating device 10 may be recorded in the digital recorder 18 together with the corresponding measurement, for example by recording the output of a suitable counter driven by the linkage 20 which steps the recorder 18.

Because of the long and somewhat elastic cable 13, the investigating device 10 is subject to displacement due to cable stretch, with the result that the true depth level of some measurements may be different from the depth level registered by the depth recorder 21. (The depth level registered by the depth recorder 21, which is identical with that registered by the tape recorder 18 is designated "Z".) When attempting to depth match a log produced by the investigating device 10 with the log produced from another investigating device 10 passed through the same borehole 11 at a different time, there is a possibility that the measurements recorded by the two investigating devices at the same depth level will not be referenced to the same true depth level. The same may occur when two logs are obtained from two different boreholes 11, and when two or more logs are obtained from the same pass of an investigating device 10 through a borehole 11.

As an illustration, logs A and B of FIG. 2 are of the same or similar measurements and are made during different passes of the investigating device 10 through the borehole 11. By observation, it can be seen that the two logs have similar, though depth-shifted details. Considering the log A as the "base log", it can be seen that at the depth level Z1, log B is depth shifted by an amount X from log A. The same is true at depth level Z2. Then, at depth level Z3, the two logs are depth matched, i.e., the depth shift between them is zero. Then, at the depth level Z4, the depth shift becomes 3X. (X is in units of length.) When attempting to combine measurements from the logs A and B which are supposed to be taken at the same depth Z, the results may be in error because of the poor depth matching or depth correlation between the logs A and B.

One technique for obtaining a measure of the correlation between two logs is the use of a correlation function whose value indicates the degree of depth correlation. One technique of this type is disclosed in the U.S. patent application of John P. Timmons and James J. Maricelli filed on July 31, 1972, and assigned Ser. No. 276,348. This technique involves comparing a segment of a compare log with a segment of a base log by means of a normalized correlation function, and providing a correlogram which is a plot of the value of the correlation function versus displacement between the two segments. It should be clear that the labels "base" and "compare" may be interchanged.

As an example which is pertinent to the subject invention, assume that a 20 foot segment of the compare log is to be correlated with a 30 foot segment of the base log (see FIG. 3). The start depths, i.e., the indicated centers of the two log segments are at the same 60 foot depth. Assume that a measurement is taken at each 6 inch interval to obtain the two logs. In applying the normalized correlation function, a correlogram is derived by, in effect, aligning the top ends of the compare log segment and of the base log segment and correlating, then moving the compare log segment 6 inches down with respect to the base log segment and correlating again, and repeating this procedure until the bottom ends of the two log segments are aligned. This results in twenty-one correlation coefficients, i.e., twenty-one values of the correlation function. Successive segments of the compare log may be similarly correlated with corresponding successive segments of the base log to obtain a sequence of correlograms. Each correlogram is for a defined starting depth, i.e., for a defined indicated depth of the two segments which are correlated to derive the correlogram.

A correlogram may be plotted on a coordinate system of correlation function value versus shift (displacement) between the segments. The normalization may be such that the correlation function value ranges between +1 and −1, with +1 indicating perfect correlation and −1 indicating anticorrelation. A correlogram plot (in analog form) is shown in FIG. 4. The shift value of the peak of the curve in FIG. 4 indicates how much and in which direction the two segments (whose starting depths are the same) should be shifted with respect to each other in order to depth-correlate them.

Figure 5:
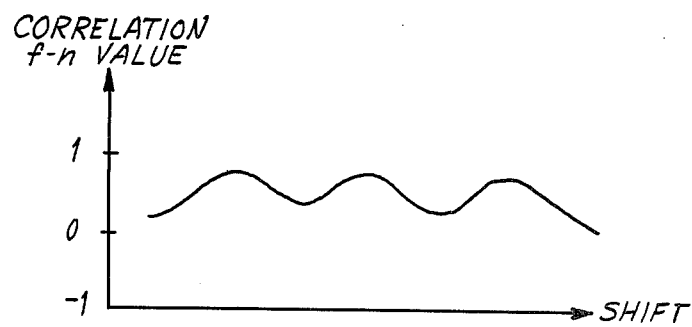

While the correlogram in FIG. 4 indicates unambiguously how the two log segments from which it is derived must be shifted with respect to each other, there may be correlograms, such as the one shown in FIG. 5, which have two or more peaks. In such cases, it is not clear which one of these peaks, if any, should be taken as the desired shift between the two correlated segments. Additionally, the peaks of successive correlograms may be such that no meaningful trends of change of shift are indicated.

Figure 6:
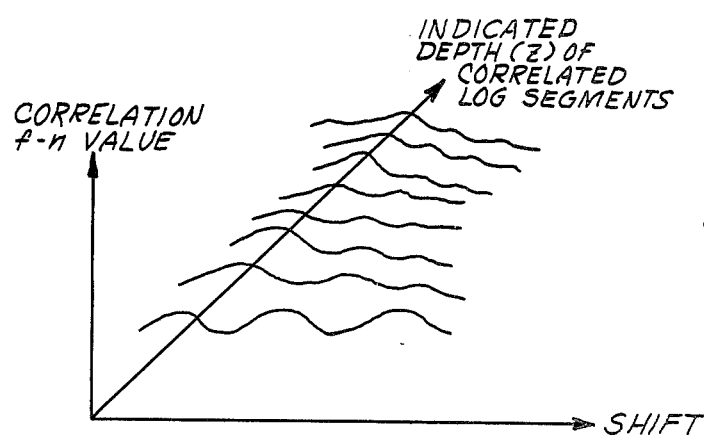

Ambiguity in the peaks of correlograms and other ambiguities may be resolved to a certain extent by looking for trends in a plurality of correlograms. Referring to FIG. 6, which shows a plurality of correlograms arranged along a third dimension Z, which is the indicated starting depth of the correlograms, it is seen that there are certain trends which persist and certain trends which are short-lived. Depending on the quality of the correlograms, and on a number of other factors, it may be reasonable to assume that trends which do not persist tend to reflect transient events that could be disregarded, while trends which persist could be taken as tending to be reliable indications of how the logs resulting in these correlograms could be shifted with respect to each other.

In fact, a highly skilled interpreter can examine by observation a group of correlograms (of the type shown in FIG. 6, but comprising many more correlograms), and can decide on the basis of long experience and perhaps on the basis of some other knowledge regarding the starting logs, if there are certain trends which appear reasonably reliable, and what these trends may be said to mean in terms of desirable shifts between the starting logs. Since there are hundreds or even thousands of correlograms between any two typical logs, and since usually a number of logs are to be correlated, it can be appreciated that it is difficult and not very reliable to look for trends by observation and to interpret the meaning of trends by observation. Additionally, it can be appreciated that interpretation of correlograms by observation is time-consuming, that it requires highly experienced interpreters, and that it is highly subjective.

The subject invention therefore provides a method of utilizing a digital computer to process correlograms of the general type shown in FIG. 6 in a novel manner and by novel techniques in order to first reduce the amount of data which must be processed by eliminating data determined to be less reliable and to leave only reasonably valid data, and to then process this valid data to find and compute desirable shifts between the starting logs and the depth at which these shifts should be made.

The starting data for the subject invention are correlograms which are of the type shown in FIG. 6, but which are digitized. For example, when each of the correlograms that appear as individual curves in FIG. 6 is digitized on a scale of 10, it is converted thereby to a row of decimal numbers each ranging in value from 0 to 9. In the correlation example discussed in connection with FIG. 3, this would result in a correlogram consisting of 21 correlation coefficients. It should be understood, of course, that this is an arbitrary example, and that correlograms consisting of other suitable numbers of correlation coefficients, and scaled differently may be utilized in accordance with the subject invention.

The starting data for the subject invention is thus a two-dimensional array of digitized correlograms. The correlograms may be obtained with the use of the invention disclosed in the copending Timmons and Maricelli patent application cited above (See FIG. 6 thereof and the derived $C_K$ values).

Figures 7, 8:
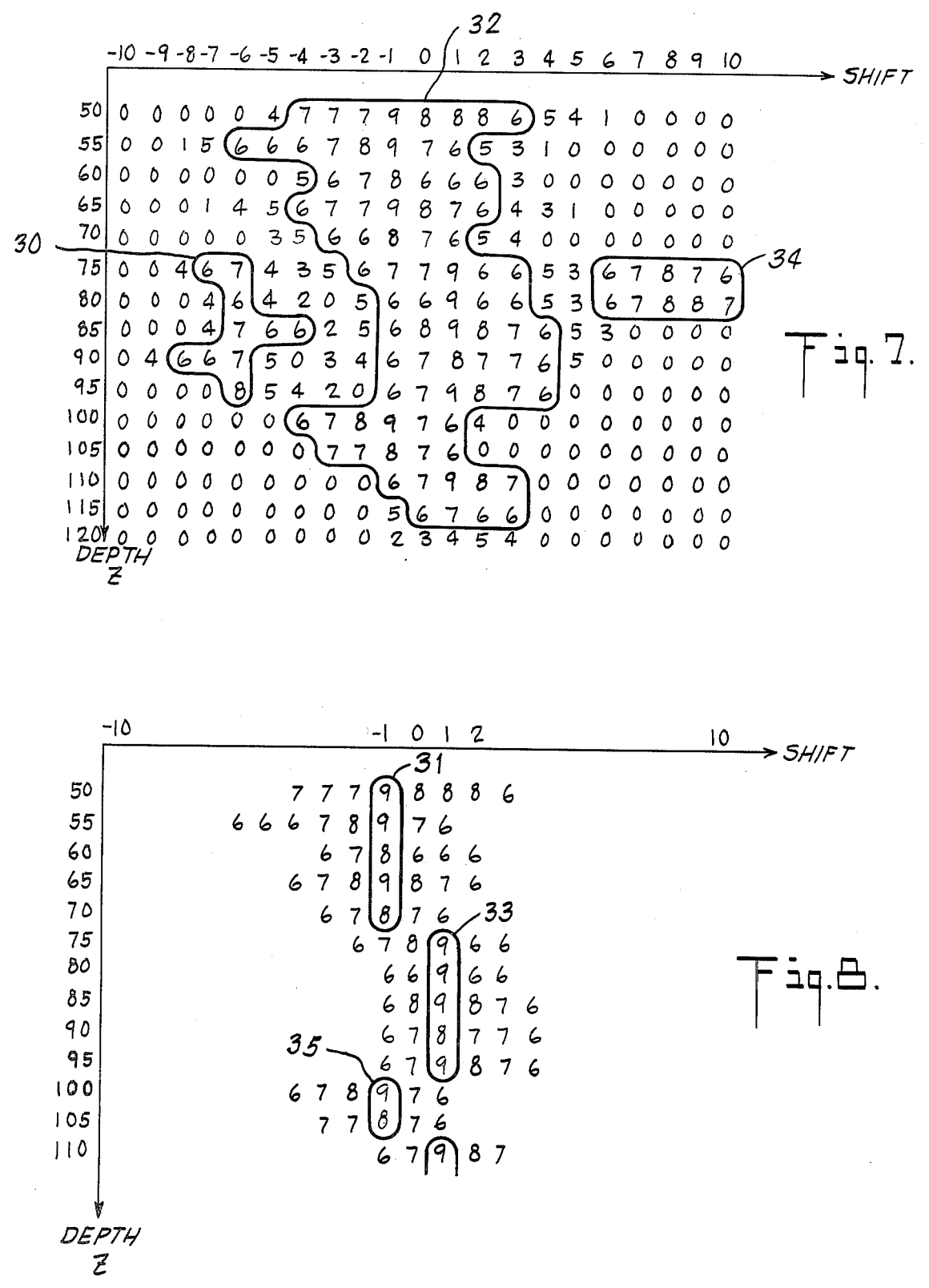

An exemplary portion of a correlogram array of this type is illustrated in FIG. 7 of this specification, where the vertical dimension is the correlogram depth, i.e., the start depth of the two log segments which are correlated to produce the corresponding row of 21 correlation coefficients, and the horizontal dimension is the shift (displacement with respect to each other) of the central points (start depths) of the two segments at which the shown correlation coefficient value is obtained. The correlation coefficient is the decimal value given at the intersection of a depth value and a shift value in the array of FIG. 7.

It is recognized in the subject invention that the amount of data, i.e., the number of correlation coefficients, which should be processed may be substantially reduced by defining some elimination parameters. For example, a cut-off parameter may be defined to eliminate as "invalid" correlation coefficients whose value is 5 or below 5. In the example of FIG. 7, the application of a cut-off parameter of this type would leave only the three groups of correlation coefficients identified by the reference numerals 30, 32 and 34. Each group consists only of "valid" correlation coefficients.

An additional reduction in the amount of data which must be processed, and an additional decrease in ambiguity of trends, may be obtained according to the invention by defining and applying one or more "neighbor" parameters. In the example of FIG. 7, one neighbor parameter may be that each of the correlation coefficients within the groups 30, 32 and 34 must have at least two valid neighbors on the left and two valid neighbors on the right. This type of a neighbor parameter would eliminate group 30 and would leave only groups 32 and 34 for further processing.

The correlation coefficients of the group 32 of FIG. 7 are shown alone in FIG. 8. It can be appreciated that there are certain apparent trends within the group 32. For example, the correlograms for the 50 feet through 70 foot depths each have the maximum correlation coefficient at the −1 shift position, the correlograms for the 75 foot through 95 foot depth each have the maximum correlation coefficient at the +1 shift position, and the correlograms for the 100 and 105 foot depths each have their maximum coefficients at the −1 shift position. These trends are tested by one more parameter in accordance with the subject invention. This parameter reflects possible errors introduced by end effects, and is applied by eliminating a selected number of correlograms from the beginning depth and the end depth of a group of the type shown in FIG. 8.

Figure 9:
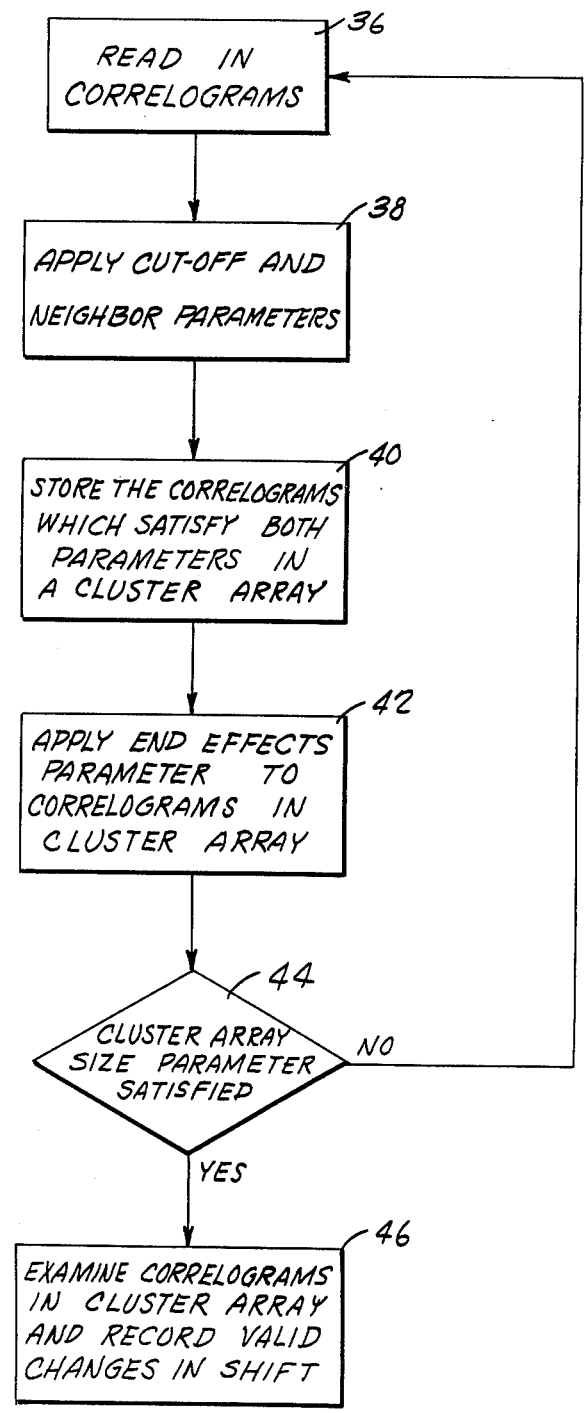
FIG. 9 illustrates the major steps of the invented method.

The invention may be described in very general terms by reference to FIG. 9 which shows its major functional steps. Examples of the steps are given by reference to FIGS. 7 and 8 discussed above.

The starting data for the functional steps of FIG. 9 is a two dimensional array of digitized correlograms of the type shown in FIG. 7. A single correlogram is read at step 36 of FIG. 9, for example, the correlogram for the 50 foot depth level of FIG. 7.

At step 38 of FIG. 9, a cut-off prameter and a neighbor parameter are applied to the correlogram which was read at step 36.

The cut-off parameter is designed to eliminate correlation coefficients which are considered insufficiently reliable to warrant further processing. For example, of the cut-off parameter is 5, each correlation coefficient of the correlogram read in at step 36 is compared with 5, and only the correlation coefficients which are 6 or above are retained. Additionally, if the correlogram contains no value which is above the cut-off parameter, it is suitably flagged. The correlation coefficients which are not eliminated by the application of the cut-off parameter are called "valid" correlation coefficients in this specification. In the example of the top correlogram of FIG. 7, the correlation coefficients which are outside the group 32 are eliminated and the correlation coefficients which are within the group 32 are valid correlation coefficients.

The neighbor parameter may be the requirement that the maximum correlation coefficient of a correlogram be flanked by two valid correlation coefficients on the right-hand side and by two valid correlation coefficients on the left-hand side. In the example of FIG. 7, the correlogram at the 50 foot depth has a maximum correlation coefficient which is 9, and it is flanked by two eights on the right-hand side and by two sevens on the left-hand side. Therefore, this correlogram satisfies the neighbor parameter. The correlogram for the 115 foot depth of FIG. 7 has a maximum correlation coefficient which is 7, and it has two valid neighbors on the right-hand side, but only one valid neighbor on the left-hand side. Therefore it does not satisfy the neighbor parameter.

It should be clear that the cut-off parameter can be any other suitable value, and that the neighbor parameter may be any other suitable value, or may be different in kind. For example, the neighbor parameter may alternately be the requirement that each correlogram have a valid maximum correlation coefficient which is flanked on the left and on the right, and above and below by a suitable defined number of valid correlation coefficients. Still alternately, the neighbor parameter may be N-dimensional, and the dimensions may be attributes which may include the number of valid neighbors on given sides of the maximum correlation coefficient of a correlogram, but may also include other attributes of correlograms.

At step 40 of FIG. 9, a sequence of correlograms which satisfy both the cut-off parameter and the neighbor parameter is stored in a cluster array. The clusterr array may be a two-dimensional array of a sufficient size to store up to a selected number of correlograms. In the example of FIG. 7, the correologams for the 50 through 110 foot depth includes the group 32 which satisfies both the cut-off parameter and the neighbor parameter, and would be stored in the cluster array, while the correlogram for the 115 foot depth does not satisfy the neighbor parameter and would not be stored in the cluster array.

At step 42, an end effect parameter is applied to the group of correlograms in the cluster array. this parameter may be, for example, a requirement that the first and the last correlograms stored in the cluster array be eliminated, but may be a different parameter of this type. For example, referring to FIG. 7, the correlogram for the 50 foot depth and the correlogram for the 110 foot depth may be eliminated in order to leave in the cluster array only the more reliable central group of correlograms.

At step 44, a cluster array size parameter is applied to the correlograms which are now stored in the cluster array. This parameter reflects the recognition that trends in correlograms are valid only when a certain minimum number of correlograms reflect these trends. Therefore, a cluster array size parameter may be the requirement that the cluster array contain, after the operation of step 42, a certain minimum number of correlograms, such as three correlograms.

If the cluster array does not satisfy the test of step 44, new correlograms are read in at step 36 for a new cycle of storing a sequence of correlograms which satisfy the cut-off parameter and neighbor parameter in the cluster array.

If the test at step 44 is satisfied, the correlograms which are retained in the cluster array are examined for valid changes of shift. A valid change of shift may be defined as a shift between two apparently reliable trends, such as a shift between a set of at least three correlograms which have their maximum correlation coefficient at the same position and another adjacent set of at least three correlograms which have their maximum correlation coefficient at the same position, with the positions of the maximum correlation coefficients as between the two sets being different. In the example of FIG. 8, the shift between the sets of correlograms containing the correlation coefficient maxima identified by the reference numerals 31 and 33 would be valid, while the shift between the sets identified by the reference numerals 33 and 35 would not be valid because the set 35 consists of only two correlograms.

One embodiment of the invention is a method of operating a digital computer, such as an IBM System 360/65. This embodiment of the invention can be expressed in a standard high level programming language, such as Fortran or PL/1, which can be translated by conventional compilers into a machine language form executable on the computer. Applicants consider it, however, more informative to describe this embodiment of the invention in terms of a detailed flowchart, where each step of the flowchart is directly expressible in a single high level language statement or at most in a very low number of such statements. A detailed flowchart, therefore, is shown in FIGS. 10, 11 and 12, which can be put together as indicated to form a single flowchart.

Figure 10:
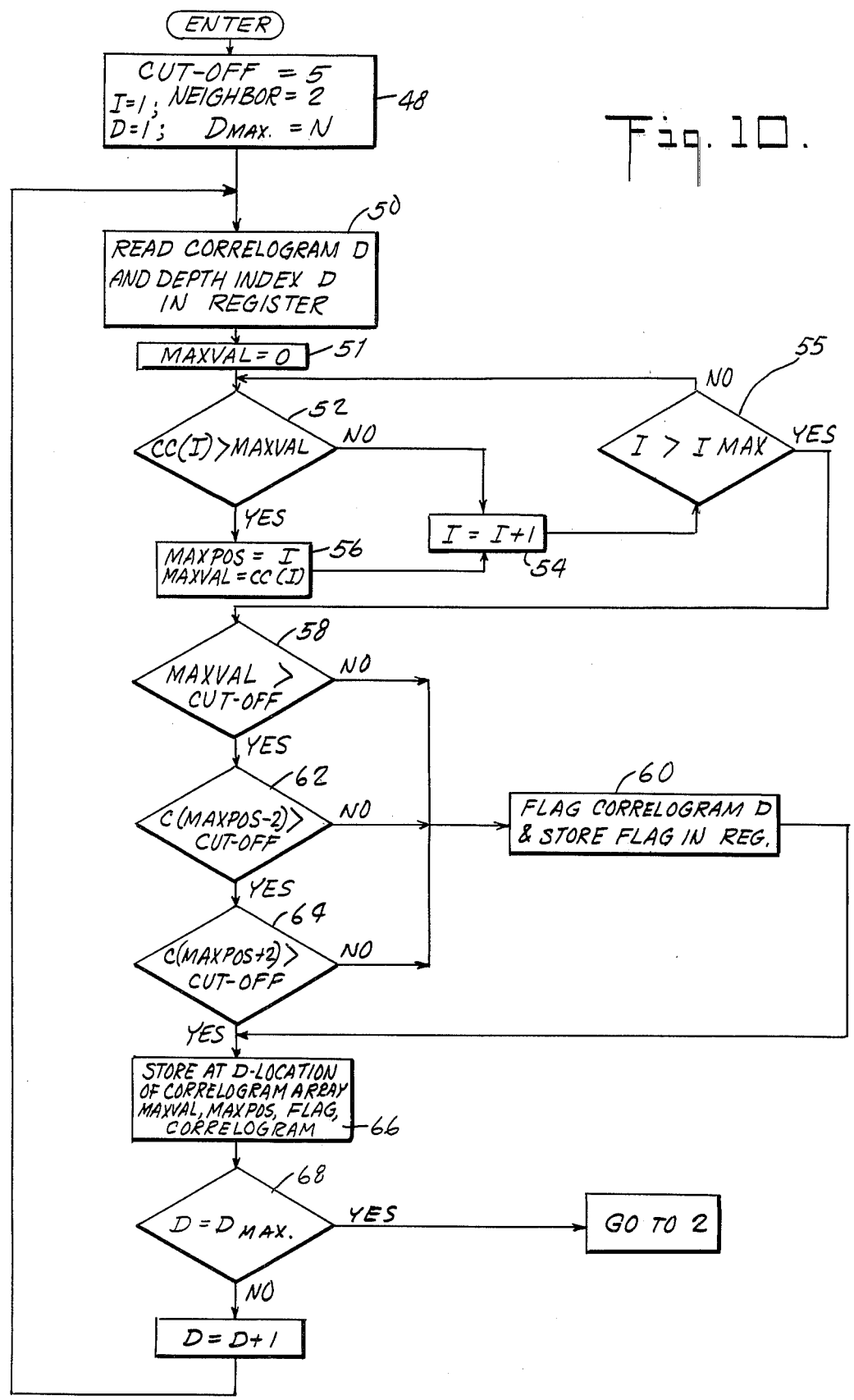
FIGS. 10, 11, and 12 illustrate the detailed steps of an embodiment of the invented method.
Figure 11:
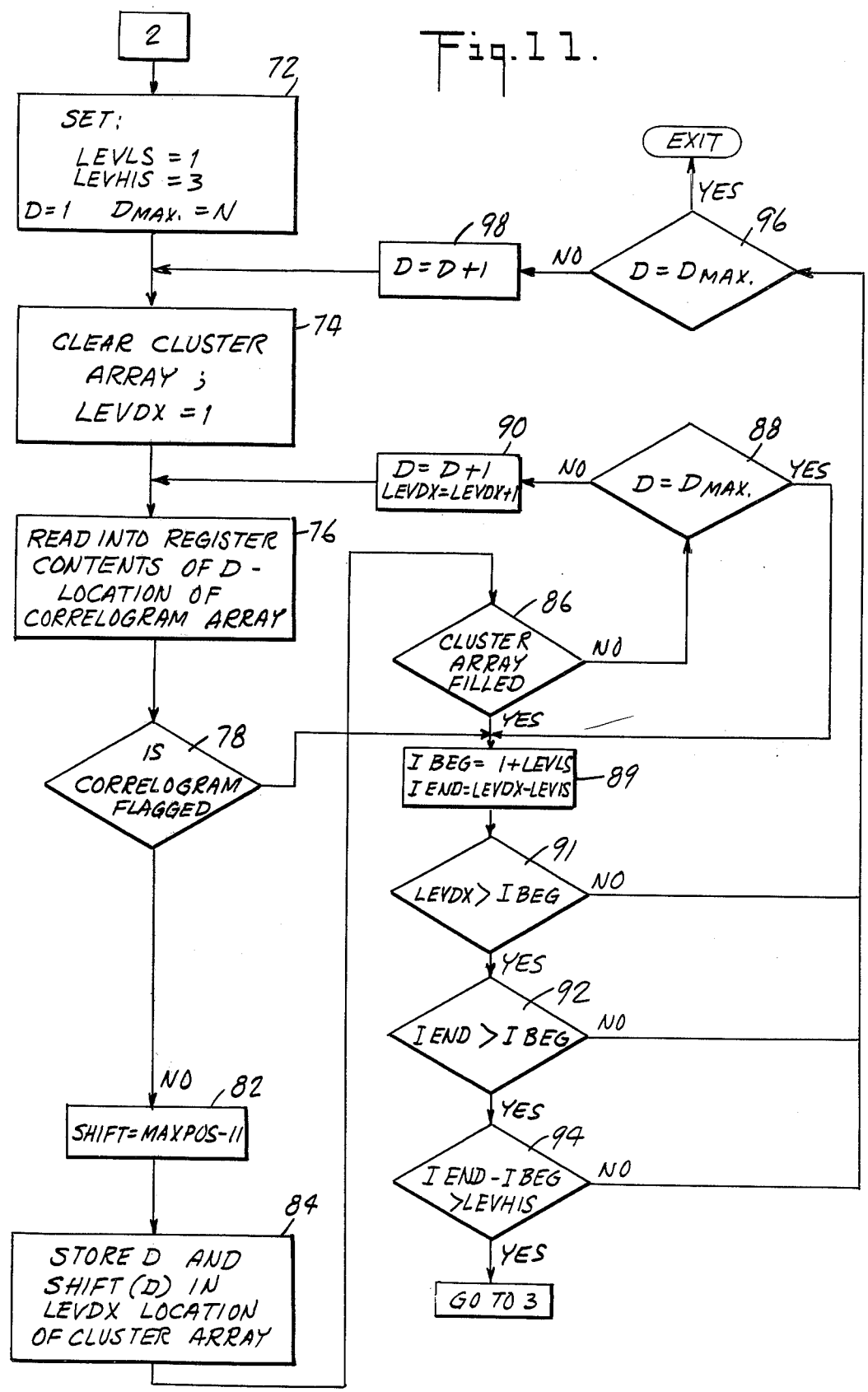
Figure 12:
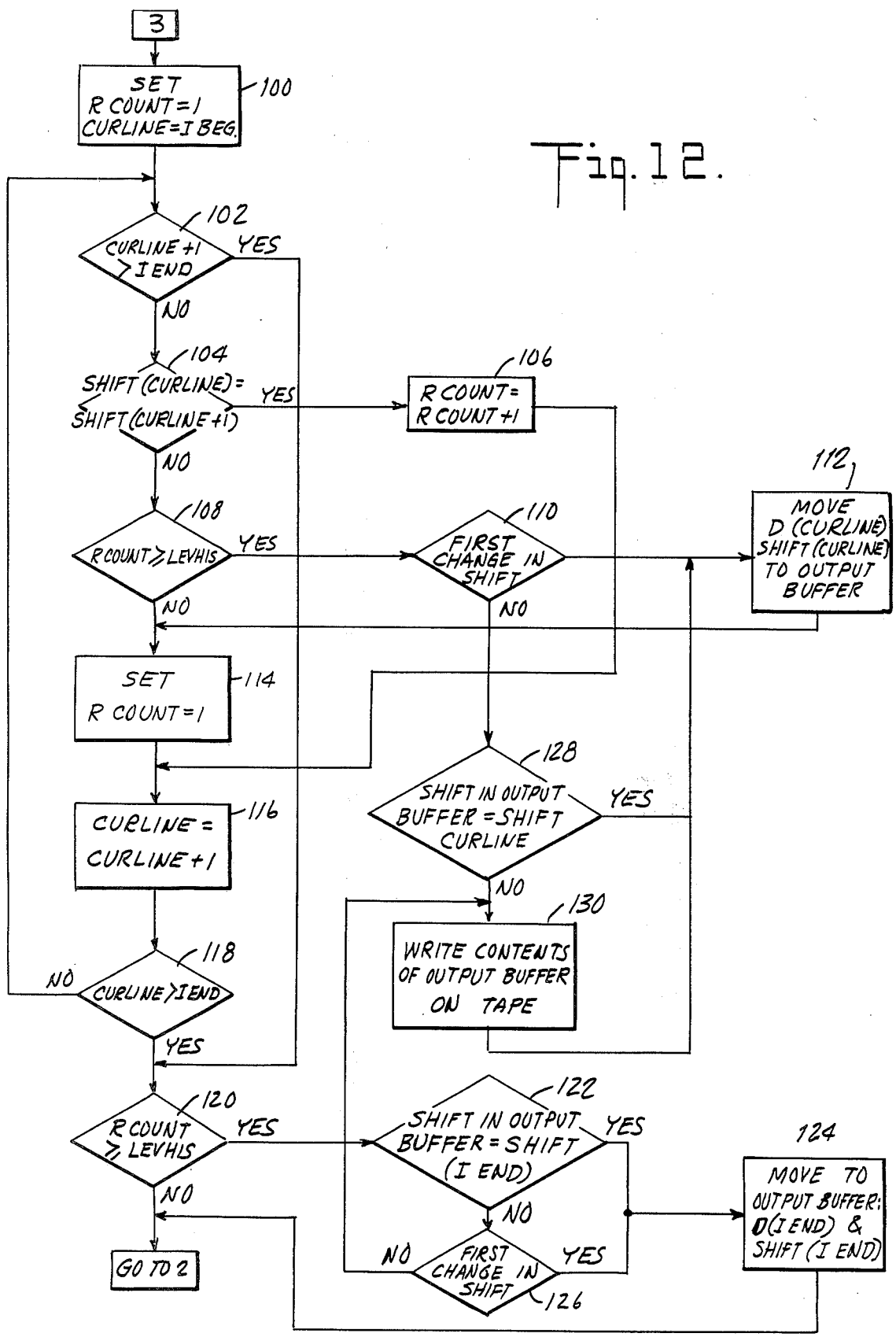

It is noted that the procedure of FIGS. 10, 11 and 12 would normally be a subroutine of a larger software system concerned with processing well logging data, and would be entered and executed in a conventional way. However, for the sake of simplicity, the procedure of FIGS. 10, 11 and 12 is described below as a freestanding system which starts with certain input data and ends when certain results are generated. The conventional steps which may be involved in running a software system (or a subroutine) on a computer, such as partitioning a memory portion, providing disc and tape space, etc. are omitted for simplicity, and only the actual invention is disclosed in detail.

Referring to FIG. 10, entry is to step 48 at which certain parameters and constants are defined. Thus, a cut-off parameter is defined as the decimal number 5, a neighbor parameter is defined as the decimal number 2, an index I is set equal to 1, a correlogram depth index D is set equal to 1, and a constant $D_{max}$ is set equal to a selected number. The index I is used to point to one of the twenty-one correlation coefficients forming a single correlogram, the depth index D identifies a specific correlogram of a set of N correlograms, and the constant $D_{max}$ is set to the number of correlograms which are to be processed in accordance with the invention. There is a one-to-one correspondence between each index D and a selected depth Z.

At step 50 of FIG. 10, the correlogram which is identified by the current value of the depth index D is read into a suitable register of the computer carrying out the invented method. It is assumed that a set of N correlograms of the type shown in FIG. 7 are stored on a medium such as magnetic tape, and that the tape drive is advanced at step 50 to read out one correlogram (whose depth index number is D) and to store the value read off the tape into a register of the computer.

At step 51 of FIG. 10, a variable MAXVAL is set to 0. The next step of the sequence of FIG. 10 is to find the value and the position within the correlogram of the maximum correlation coefficient of that correlogram. To do this, at step 52 the correlation coefficient CC(I) which is identified by the current value of the index I is compared in value with the variable MAXVAL. For the first run through step 52, MAXVAL is 0; since the CC(I) value can be only a 0 or a positive number, the answer at step 56 at this time must be "no". Then the pointer I is incremented at step 54, and the next CC(I) is compared with 0, etc. When the CC(I) that is compared with the initial 0 value of MAXVAL at step 56 is 1 or more, the answer at step 52 is "yes".

Then, at step 56, the current CC(I) becomes the current MAXVAL, a variable MAXPOS is set to the current value of I, and a return is made to step 54. The comparison at step 52 is now between the current CC(I) and the value to which MAXVAL was set at step 56.

The runs through steps 52 and 54 (and possibly through step 56) are stopped when a test at step 55 indicates that the last CC(I) of a correlogram has been processed in the indicated manner. When this is the case, the current MAXVAL is the value of the maximum correlation coefficient of the correlogram, and the MAXPOS is set to its pointer I.

Referring to FIG. 7 for an example, the run through steps 52, 54, 55 and 56 for the topmost correlogram of FIG. 7 would be comparing the leftmost correlation coefficient with 0, then moving one correlation coefficient to the right, repeating the comparison, and repeating until the correlation coefficient 4 is encountered. Then 4 is compared with 0, the answer at step 52 is "yes", and MAXVAL =4 and MAXPOS =pointer I of 4. Then 7 is compared with 4 at step 52, MAXVAL is now set to 7, and MAXPOS is changed to the pointer of the leftmost 7, etc., until 9 is the MAXVAL and the pointer I of 9 is the MAXPOS.

At step 58 of FIG. 10, the value of the maximum correlation coefficient found previously is compared with the cut-off parameter, and if it does not exceed the cut-off parameter, the correlogram is flagged at step 60. In the example of FIG. 7, the correlogram whose depth is 120 feet has a maximum of 5; this correlogram would not satisfy the test at step 58 of FIG. 10, and it would be flagged at step 60.

If the answer at step 58 is "yes", i.e., if the correlogram which is currently considered has a maximum correlation coefficient which exceeds the cutoff parameter, tests are made at steps 62 and 64 to see if the correlogram satisfies the neighbor parameter. At step 62 the correlation coefficient which is two correlation coefficient positions to the left of the maximum correlation coefficient is tested to see if it exceeds the cut-off parameter. If the answer is "no", the correlogram is flagged at step 60; if the answer is "yes", a test is made at step 64 to see if the correlation coefficient which is two positions to the right of the maximum satisfies the cut-off parameter. If the answer is "no", the correlogram is again flagged at step 60. Referring to FIG. 7 for an example, if the first correlogram, at the top of FIG. 7, is examined at steps 62 and 64, the test of step 62 would be if 7 exceeds 5 and the test at step 64 would be if 8 exceeds 5. For the correlogram at the 115 feet depth of FIG. 7, the test at step 62 would be if 5 exceeds 5, with the result that the correlogram would be flagged at step 60 and the test at 64 would not be performed.

In step 66 of FIG. 10, the correlogram which was stored in the register at step 50, and its MAXPOS and MAXVAL determined at step 56 and the flag from 60, if any, are stored in a correlation array, at a position identified by the index D of that correlogram. The correlation array used in step 66 may be an array in the core memory of the computer, or it may be any other suitable storage medium such as a tape or a disc.

At step 68 a test is made to determine if the D index of the current correlogram is equal to the D index of the last correlogram which is to be processed ($D_{max}$). If the answer is "no", a return is made to step 50 to read into the register (destructively) the next correlogram from the tape. If the answer at step 68 is "yes", the sequence continues to the flowchart in FIG. 11.

After the sequence of FIG. 10, each of a selected number of correlograms has been examined to determine the position and the value of the maximum correlation coefficient in it, whether the maximum correlation coefficient exceeds the set cut-off value, and whether the maximum correlation coefficient has at least the set number of valid neighbors on the left and on the right-hand side. The information determined in this sequence has been stored, together with the correlogram, in a correlogram array, at a location identified by the index number D for the correlogram. The procedure of FIG. 11 then processes the information which has been stored in the correlogram array as a result of the procedure of FIG. 10.

In FIG. 11, certain parameters are set at step 72. The parameter LEVLS is set equal to 1, the parameter LEVHIS is set equal to 3, the correlogram index D is set at 1, and the index $D_{max}$ of the last correlogram which is to be processed is set equal to a selected number. The parameter LEVLS is the end effects parameter discussed earlier. Referring back to FIGS. 7 and 8, the procedure of FIG. 11 would read into a cluster array the correlation coefficients of group 32, which are shown in FIG. 8, and the parameter LEVLS specifies how many levels from the beginning and end of the cluster array contents should be dropped. In the example of FIG. 8, and assuming that LEVLS equals 1, the lines for the 50' and the 110' depth of FIG. 8 would be eliminated in the course of the procedure of FIG. 11.

The parameter LEVHIS indicates the minimum number of levels that should be in the cluster array to give a meaningful result. If LEVHIS is 3, a cluster array must contain at least five (that is, 3+1+1) levels before the parameter LEVLS has been applied. In the example of FIG. 8, the levels from 55' through 105' inclusive remain after the parameter LEVLS is applied, so that the cluster of FIG. 8 would satisfy the parameter LEVHIS. It should be clear that other suitable values may be selected for the parameters LEVLS and LEVHIS.

At step 74 of FIG. 11, a cluster array of a suitable size is cleared, and an index LEVDX is set equal to 1. The index LEVDX points to the first storage location in the cluster array cleared at step 74. Each storage location in the cluster array can contain a level, i.e., a correlogram identified by its D index and associated information.

At step 76 of FIG. 11, the contents of the D location of the correlogram array set up in the course of FIG. 10 are read into a suitable register. For the first run through step 76, the D location stores the first correlogram of the correlogram array, as well as the information about that correlogram found in the procedure of FIG. 10.

At step 78, a test is made to determine if the correlogram read into the register at step 76 is flagged. Referring to FIG. 7 for an example, the correlogram for the 50' depth level would not be flagged, but the correlograms for the 115' and 120' depth levels would be flagged. If the answer at step 78 is "yes", this is a correlogram which is not reliable, and a transfer is made to a step 89 which is discussed below.

If the test at step 78 is "no", i.e., if the correlogram is not flagged, a value SHIFT is computed at step 82 by subtracting 11 from the index number I of the maximum correlation coefficient of the correlogram. In the example discussed here, there are 21 correlation coefficients in a correlogram. If the index I ranges from 1 to 21, the value of the variable SHIFT considered at step 82 is the displacement (along the shift dimension) between the center of the correlogram and the position of its maximum correlation coefficient. The displacement is in units which correspond to the shift dimension difference between two adjacent correlation coefficients of a correlogram. Referring to FIG. 7 for an example, the calculation at step 82 results in the SHIFT numbers indicated along the horizontal dimension of the coordinate system.

At step 84 of FIG. 11, the index D of the current correlogram (which index indicates the correlogram depth Z), and the shift for it computed at step 82 are stored in the location of the cluster array that is identified by the current value of the index LEVDX.

After step 84, a test is made at step 86 to determine if the culster array is filled. If the answer is "no", a test is made at step 88 to determine if the correlogram which is being processed is the last one from the correlogram array. If it is not the last one, at step 90 the index number of the next correlogram from the correlogram array is obtained by incrementing the current index D by 1, and the next free location in the cluster array is obtained by incrementing the index LEVDX by 1.

If the test at step 78 of FIG. 11 determines that the current correlogram is flagged, or if the test at step 86 determines that the cluster array is filled, at step 88 a pointer IBEG is calculated by adding 1 to the parameter LEVLS, such that the pointer IBEG points to the second level in the cluster array, and a pointer IEND is calculated by subtracting the parameter LEVLS from the index LEVDX pointing to the last line in the cluster array, such that the pointer IEND points to the next to the last level in the cluster array.

A test is made at step 91 to see if the cluster array contains at least five levels, and if the answer is "yes", a test is made at step 92 to see if the pointer IEND points to a level in the cluster array which is below the level pointed to by IBEG.

If the answers at steps 90 and 92 are "yes", a test is made at step 94 to determine if the pointers IEND and IBEG point to levels in the cluster array which are separated by at least the number of levels indicated by the parameter LEVHIS. If the answer is "yes", the cluster array now contains a cluster of a sufficient size, and the procedure continues with FIG. 12 to find if the cluster indicates any valid shifts, and if so, what shifts.

If the test at either one of the steps 91, 92, and 94 of FIG. 11 yields a "no" answer, this indicates that the cluster array does not contain a satisfactory number of levels. Therefore, a test is made at step 96 to see if any correlograms remain in the correlogram array, and if the answer is that there are remaining correlograms, the next correlogram is indexed at step 98, and a return is made to step 74 to start building up a new cluster array. If the test at step 96 indicates that there are no more correlograms left for processing, an exit is made from the invented procedure. The exit may be to a subsequent portion of a larger software system, or it may be simply an end.

If the test at step 88 of FIG. 11 indicates that the last correlogram has been read from the correlogram array in the last execution of step 74, then a return is made to step 89 to start processing the current contents of the cluster array.

If the step "go to 3" has been reached in FIG. 11, the cluster array contains a valid cluster which results from correlograms that satisfy the pertinent parameters, and the cluster size is sufficient. In the procedure of FIG. 12, the information in the cluster array is examined to determine if it indicates valid shifts, and to find out what these shifts are.

If the exemplary correlograms of FIGS. 7 and 8 are processed through FIG. 11, the cluster array would contain, for each of the levels of the 50' through 70' depth levels, a D index identifying the level and a shift value of −1. For each of the 75' through 95' depth levels, the cluster array would contain a D index, and a shift value of +1. For each of the depth levels of 100' and 105', the cluster array would contain a D index number, and a shift value of −1, and, for the depth level of 110', the cluster array would contain a D index and a shift value of +1. The pointer IBEG would point to the storage location for the 55' depth level and the pointer IEND would point to the storage location in the cluster array for the 105' depth level.

Referring to FIG. 12, at step 100 a variable RCOUNT is set equal to 1, and a position indicator CURLINE is set equal to the value IBEG which was found in the procedure of FIG. 11. In the example of FIG. 8, the indicator CURLINE would point to the location in the cluster array corresponding to the 55' depth level. The variable RCOUNT is to keep track of the number of successive levels in the cluster array which have the same shift.

At step 102 of FIG. 12, a test is made to see if there is a remaining level in the cluster array. This test is made by determining if the value CURLINE +1 is greater than the value IEND.

If the answer at step 102 is "no", i.e., if there are remaining levels in the cluster array, a test is made at step 104 to see if the shift of the line in the cluster array identified by the current value of the indicator CURLINE is equal to the shift of the next line in the cluster array. If the answer at step 104 is "yes", the variable RCOUNT is incremented by 1 at step 106, and then a transfer is made to a step 116 which is discussed below. If the answer at step 104 is "no", then a test is made at step 108 to determine if the current value of RCOUNT is greater than or equal to the parameter LEVHIS which was set at the beginning of the procedure of FIG. 11. Referring to the example of FIG. 8, if CURLINE points to the cluster array location for the 65' depth level, step 104 compares −1 with −1, with a "yes" answer. If CURLINE points to the cluster array location for the 70' depth level, step 104 of FIG. 12 compares −1 with +1 with a "no" answer. For the first group of levels in FIG. 8, step 108 of FIG. 12 would be reached when the value of RCOUNT is 4. Hence, the test at step 108 would give a "yes" answer. Near the end of the levels in FIG. 8, the value of RCOUNT for the 105' depth level would be 2, and the test at step 108 of FIG. 11 would give a "no" answer.

If the answer at step 108 is "yes", a test is made at step 110 to determine if this is the first change of shift detected in the cluster array. Referring to the example of FIG. 8, the first change of shift is between the 70' and 75' depth levels, the second change of shift is between the 95' (and the) 100' depth levels, and the third change of shift is between the 105' and the 110' depth levels. If the answer at step 110 is "no", a transfer is made to a step 128 which is discussed below. If the answer at step 110 is "yes", the depth and shift of the location in the cluster array identified by the current value of CURLINE are moved to an output buffer at step 112. In the example of FIG. 8, and assuming that the change of shift between the 70' and 75'depth levels is considered, the D index for the 70' depth level and the shift value of −1 are placed in the output buffer.

If the answer at the test of step 108 is "no", or after the procedure of step 112, the variable RCOUNT is reset to 1 at step 114, then the variable CURLINE is incremented by 1 at step 116. After step 116, a test is made at step 118 to determine if the current value of CURLINE is greater than the value IEND computed in the procedure of FIG. 11. If the answer is "no", a return is made to step 102; if the answer is "yes", a test is made at step 120 to determine if the current value of RCOUNT is greater than or equal to the parameter LEVHIS which was set in the procedure of FIG. 11. Referring to FIG. 8 for an example, and assuming that the cluster array location which corresponds to the 100' depth level is the CURLINE before step 116 of FIG. 12, the test of step 118 would be whether the cluster array location for the 105' depth level is greater than the last level in the cluster array, and the answer at step 118 would be "yes". The test at step 120 then would be whether 2 is greater than or equal to 3, with a "no" answer.

If the answer at step 120 is "no", a return is made to the procedure of FIG. 11 because a "no" answer at step 120 indicates an insufficient number of adjacent cluster array levels which have the same shift. If the answer at step 120 is "yes", a test is made at step 122 to determine if the shift value which is currently in the output buffer is equal to the shift value of the cluster array location identified by the pointer IEND. If the answer at step 122 is "yes", the index D and the shift of the location in the cluster array identified by the pointer IEND are moved to the output buffer, and a return is made to the procedure of FIG. 11 to start building a new cluster array. If the answer at step 122 is "no", a test is made at step 126 to determine if this is the first change of shift found in the procedure of FIG. 12. If the answer at step 126 is yes, a return is made to step 124; if the answer at step 126 is "no", the current contents of the output buffer are stored on tape as one valid result of the procedure of FIG. 12.

If the answer at step 110 is "no", a step 128 is entered to determine if the shift which is currently in the output buffer is equal to the shift of the location in the cluster array identified by the current value of CURLINE. If the answer at step 128 is "yes", a return is made to step 112; if the answer at step 128 is "no", the depth and shift that are currently in the output buffer are stored on tape as a valid result of the procedure of FIG. 12, and a return is made to step 112.

After the procedure at FIG. 12 has been executed, the contents of the cluster array which was built by the procedure of FIG. 11 are examined, with one of several possible results. One result may be that a cluster array does not contain information indicating valid changes of shift. In that case a return is made to the procedure of FIG. 11 to start building a new cluster array. Another possible result of FIG. 12 is one or more valid changes of shift, such as the change of shift between the cluster array locations corresponding to the 75' and the 80' depth levels of FIG. 8. In that case, the information identifying this valid change of shift is stored in an output buffer. Next time a valid change of shift between two adjacent depth levels is detected, the index number of the level at the change of shift, and the shift value thereof are moved to a tape to be stored as a valid result of the procedure of FIG. 12, and a return is made to FIG. 11 to start building a new cluster array. In the example of FIG. 8, the change of shift between the 95' and 100' depth levels is not a valid one, therefore the shifts stored in the output buffer for the 70' ro 75' depth level shift remains in the output buffer until a valid change of shift is encountered.

We claim:

1. A machine-implemented method of modifying a depth-varying first log of a borehole in an earth formation to generate an improved version thereof comprising the steps of:

matching portions of said first log with portions of a second log at various depths therealong to generate a plurality of signals indicative of the degree of correspondence therebetween;

filtering said signals according to predetermined criteria to remove unsuitable signals or portions thereof from further consideration;

grouping the remaining filtered signals into groups of signals, each group comprising members which are depth-wise adjacent neighbors of at least one other member of the group;

filtering said groups of signals according to predetermined criteria to remove unsuitable groups or portions thereof from further consideration;

matching the members of the remaining filtered groups of signals with one another to identify any recognizable trends and to determine valid depth-shifts therefrom; and depth-shifting said first log according to said valid depth-shifts to generate an improved tangible representation of the first log.

2. A machine-implemented method as in claim 1 in which the step of filtering the signals according to predetermined criteria comprises testing each signal against a cut-off parameter to filter out those signals which fail to satisfy the cut-off parameter test.

3. A machine-implemented method as in claim 2 in which the step of filtering said signals according to predetermined criteria further comprises testing said signals against a neighbor parameter indicative of attributes of adjacent signals and filtering out those signals which fail to satisfy the neighbor parameter test.

4. A machine-implemented method as in claim 3 in which the step of filtering said groups of signals comprises testing each group against a size parameter and filtering out those groups which fail to satisfy the size parameter test.

5. A machine-implemented method as in claim 4 in which the step of matching the members of the remaining filtered groups of signals to identify any recognizable trends comprises testing each group to identify the presence of sequences of depth-successive signals indicative of same or similar desirable depth-shift over at least a selected depth span in the borehole.

6. A machine-implemented method of generating a tangible representation of a combination of first and second depth-matched logs from first and second depth-mismatched logs of a borehole in an earth formation comprising the steps of:
comparing portions of said first and second depth-mismatched logs at various depths therealong to generate a plurality of signals indicative of the degree of correspondence therebetween;
filtering said signals according to predetermined criteria to remove unsuitable signals from further consideration;
grouping the remaining filtered signals into groups of signals, each group comprising members which are depthwise adjacent neighbors of at least one other member of the group;
filtering said groups of signals according to predetermined criteria to remove unsuitable groups from further consideration;
comparing the members of the remaining filtered groups of signals with one another to identify any recognizable trends and to determine valid depth-shifts therefrom; and
combining said first and second depth-mismatched logs according to said valid depth-shifts to generate a tangible representation of a combination of first and second depth-matched logs from said first and second depth-mismatched logs.

7. A machine-implemented method of generating a tangible representation of a combination of first and second depth-matched logs from first and second depth-mismatched logs taken in a borehole in an earth formation comprising the steps of:
comparing portions of said first and second depth-mismatched logs at various depths therealong to generate a plurality of signals indicative of the degree of correspondence therebetween;
filtering said signals according to predetermined criteria to remove unsuitable signals or portions thereof from further consideration;
grouping the remaining filtered signals into groups of signals, each group comprising members which are depth-wise adjacent neighbors of at least one other member of the group;
filtering said groups of signals according to preestablished criteria to remove unsuitable groups or portions thereof from further consideration;
comparing the members of the remaining filtered groups of signals with one another to identify any recognizable trends and to determine valid depth-shifts therefrom;
depth-shifting said first depth-mismatched log according to said valid depth-shifts to generate an improved log which is better suited for depth-by-depth comparison or combination with said second log; and
combining said improved log and said second log according to said valid depth-shifts to generate a tangible representation of a combination of first and second depth-matched logs from said first and second depth-mismatched logs.

8. A method of modifying a depth-varying first log of a borehole in an earth formation to generate an improved version thereof comprising the following machine-implemented steps:
matching portions of the first log with portions of a second log at various depths therealong and at various relative depth-displacements between the mutually matched respective portions of the first log and second log to generate a plurality of signals indicative of the degree of correspondence between the matched log portions at the respective relative depth-displacements therebetween;
filtering said signals according to a first set of criteria to remove unsuitable signals from further consideration;
grouping the remaining filtered signals into groups of signals, each group comprising members which are depthwise adjacent neighbors of at least one other member of the group;
filtering said groups of signals according to a second set of criteria to remove unsuitable groups or portions thereof from further consideration;
matching the members of the remaining filtered groups of signals or portions thereof with one another to identify selected recognizable trends within a group and to determine valid depth-shifts therefrom; and
depth-shifting the first log according to said valid depth-shifts to generate a tangible representation of an improved version of the first log.

9. A method as in claim 8 including combining the improved version of the first log with the second log to derive a depth-matched, improved combination of the first and second logs.

10. A method as in claim 8 in which the step of filtering the signals according to a first set of criteria includes testing the signals against a cut-off parameter and removing from further consideration the signals failing to meet the test.

11. A method as in claim 10 in which the step of filtering the signals according to a first set of criteria further includes testing each given signal against a neighbor parameter to determine if its neighbors derived on the basis of matching the same portion of the two logs have defined attributes, and removing from further consideration those signals which fail to meet the neighbor test.

12. A method as in claim 8 in which the step of filtering said signals according to a first set of criteria includes testing each signal with respect to the attributes of its neighbors derived from matching the same portions of the two logs and removing from further consideration those signals which fail to meet the neighbor test.

13. A method as in claim 8 in which the step of filtering the groups of signals according to a second set of criteria includes testing each group for size and removing from further consideration those groups which fail to meet a minimum size attribute.

14. A method as in claim 8 in which the step of matching the members of the filtered groups of signals to identify any recognizable trends within a group includes identifying as a recognizable trend a sequence of depth-successive signals which are characterized by selected criteria and which are within a group and are depth-continuous at least over a selected depth-span of the borehole.

15. A system for modifying a depth-varying first log of a borehole in an earth formation to generate an improved version thereof comprising:

means for: matching portions of the first log with portions of a second log at various depths therealong and at various relative displacements between the mutually matched respective portions of the first and second logs to generate a plurality of signals indicative of the degree of correspondence between the matched log portions at the respective relative depth-displacements therebetween; filtering said signals according to a first set of criteria to remove unsuitable signals from further consideration; grouping the remaining filtered signals into groups of signals, each group comprising members which are depthwise adjacent neighbors of at least one other member of the group; filtering said groups of signals according to a second set of criteria to remove unsuitable groups or portions thereof from further consideration; matching the members of the remaining filtered groups of signals or portions thereof with one another to identify selected recognizable trends within a group and to determine valid depth-shifts therefrom; and depth-shifting the first log according to said valid depth-shifts to generate an improved version of the first log; and means for producing a tangible representation of said improved version of the first log.

* * * * *